(12) United States Patent
Vummintala et al.

(10) Patent No.: US 7,466,759 B2
(45) Date of Patent: Dec. 16, 2008

(54) METHOD AND SYSTEM FOR RATE-2 TRANSMISSION

(75) Inventors: Shashidhar Vummintala, Bangalore (IN); Arogyaswami Paulraj, Stanford, CA (US); Erik David Lindskog, Sunnyvale, CA (US); Balaji Sundar Rajan, Bangalore (IN); Djordje Tujkovic, Palo Alto, CA (US)

(73) Assignee: Beceem Communications Inc., Santa Clara, CA (US)

( * ) Notice: Subject to any disclaimer, the term of this patent is extended or adjusted under 35 U.S.C. 154(b) by 554 days.

(21) Appl. No.: 11/175,430

(22) Filed: Jul. 5, 2005

(65) Prior Publication Data
US 2006/0008025 A1    Jan. 12, 2006

Related U.S. Application Data

(60) Provisional application No. 60/606,358, filed on Aug. 31, 2004, provisional application No. 60/602,082, filed on Aug. 16, 2004, provisional application No. 60/586,940, filed on Jul. 9, 2004, provisional application No. 60/586,444, filed on Jul. 8, 2004.

(51) Int. Cl.
    *H04B 7/02*    (2006.01)
(52) U.S. Cl. .................................................... 375/267
(58) Field of Classification Search ................ 375/267, 375/299, 347, 349; 700/53; 455/101, 132–141
See application file for complete search history.

(56) References Cited

U.S. PATENT DOCUMENTS

2004/0196919 A1*   10/2004   Mehta et al. ................ 375/267

* cited by examiner

*Primary Examiner*—Sam K Ahn

(57) ABSTRACT

The invention relates generally to the field of signal encoding in a multiple input multiple output system in a wireless communication network. This invention specifically relates to a method of encoding and transmitting symbols in a rate-2 complex symbol per second per Hertz transmission system that achieves a maximum diversity of four for a four transmit antenna system and a diversity of three on a three transmit antenna system. The invention discloses a method of interleaving the complex symbols such that each interleaved symbol comprises information of at least two complex symbols where the complex symbols obtain values from a rotated constellation.

14 Claims, 5 Drawing Sheets

METHOD AND SYSTEM FOR RATE-2 TRANSMISSION

RELATED APPLICATION DATA

This application claims priority to and incorporates by reference U.S. provisional application No. 60/586,444, filed Jul. 8, 2004, and titled "Improved Space-Time Block Codes and Decoding methods"; U.S. provisional application No. 60/586,940, filed Jul. 9, 2004, and titled "Space-time Block Codes and Decoding Methods"; U.S. provisional application No. 60/602,082, filed Aug. 16, 2004, and titled "Communication System and Methods"; and, U.S. provisional application No. 60/606,358, filed Aug. 31, 2004, and titled "Communication System and Methods."

FIELD OF THE INVENTION

The invention relates generally to the field of encoding of signals for the purpose of signal transmission in a wireless communication network comprising multiple transmit and receive antennas and specifically to a method deployed during transmitting symbols in a rate-2 complex symbol per second per Hertz transmission system while achieving maximum diversity.

BACKGROUND OF THE INVENTION

Reliability and speed of communications in a wireless network is increasingly crucial to serve growing user demands. This necessitates increasing constant improvements in technology.

Wireless communications systems can be deployed using a single transmit and a single receive antenna. The wireless channel distorts and adds other impairments to the received signal. These include additive noise, interference, time selective, frequency selective and space selective fading. Fading implies that the signal can be at different level at different antennas, or frequency or time. It is therefore important to transmit and or receive multiple replicas of the signal from multiple dimensions in space, frequency or time to increase the overall link reliability. This approach is known as diversity and is an important technique to assure reliable wireless communication over fading channels. Space diversity is obtained by using multiple antennas in the transmitter and/or in the receiver. When a multiple transmitter—receiver antenna system is deployed, not only can the reliability be improved but also the data rate can be enhanced.

Typically digital modulation of transmitted data is used. Example of such modulation schemes include M-ary QAM, M-ary PSK etc. Multiple access schemes are also employed to support multiple users. Multiple access schemes include code division multiple access (CDMA), time division multiple access (TDMA), orthogonal frequency division modulation (OFDM) and orthogonal frequency division modulation access (OFDMA) are employed. Multiple antenna schemes can be used with any modulation and multiple access scheme.

The data to be transmitted (i.e., the information bits) are encoded with a chosen coding scheme to generate coded bits. With multiple transmit antennas, coding includes the space dimension along with time or frequency dimensions and are specific to the number of transmit and receive antennas. The encoding scheme determines the diversity that can be captured, the transmission rate, and the decoding complexity at the receiver. The transmission rate refers to the average number of complex symbols that can be transmitted in one time slot or frequency bin. Transmission rate two requires at least 2 transmit and 2 receive antennas. A configuration with multiple transmit and receive antennas is known as MIMO (multiple input—multiple output).

Though different MIMO encoding schemes are available in the art, these schemes do not simultaneously support transmission rate two, low complexity decoding at the receiver, maximum transmit diversity performance, and capable of being used with more than two transmit antennas. For example the U.S. Pat. No. 6,185,258, the Alamouti code, is only a rate one scheme and applicable to two transmit antennas only. Other schemes do not offer maximum diversity or low complexity decoding.

Since wireless systems sometimes operate with more than 2 transmit antennas, there is a need to develop signal encoding scheme for a MIMO system with more than 2 transmit antennas, that support a transmission rate of two complex symbols per time slot or frequency bin, that also offers maximum diversity as well as low complexity decoding.

BRIEF DESCRIPTION OF THE DRAWINGS

The accompanying drawings when read in conjunction with the description indicate the best way in which the present invention can be implemented. A preferred embodiment of the invention is now described, by way of only illustrating an exemplary mode only, and with reference to the accompanying figures in which.

DETAILED DESCRIPTION OF THE INVENTION

Figure 1:
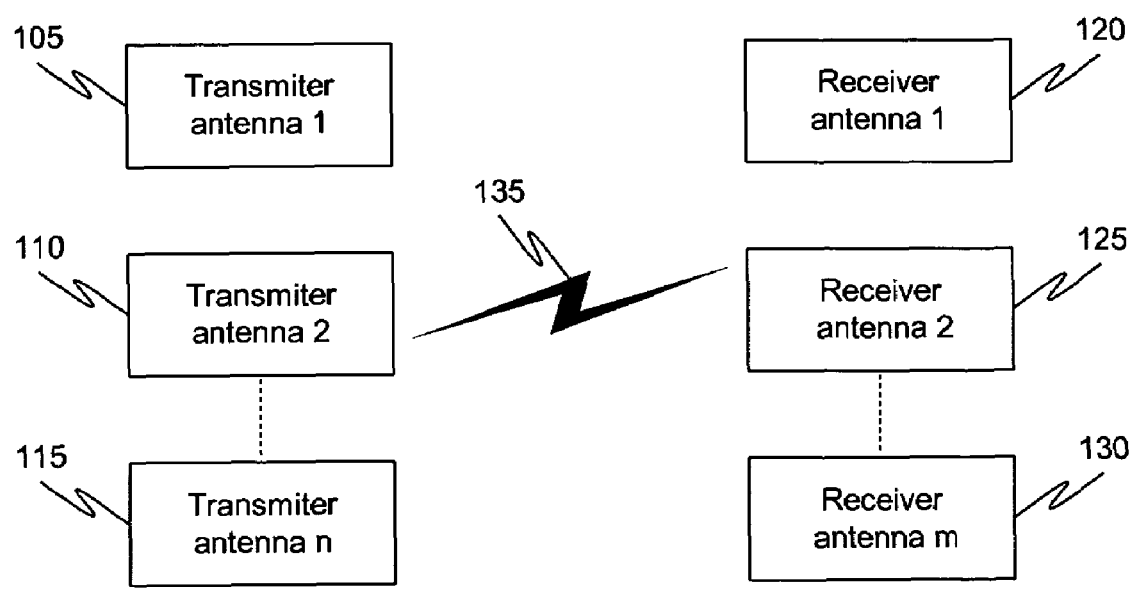
FIG. 1 shows a block diagram of a wireless communication system deploying multiple transmitter antennas and multiple receiver antennas capable of deploying various aspects and embodiments of the invention.

While this invention is susceptible of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. It will also be appreciated that for simplicity and clarity of illustration, common and well-understood elements that are useful or necessary in a commercially feasible embodiment may not be depicted in order to facilitate a less obstructed view of these various embodiments. Also, elements shown in the figures have not necessarily been drawn to scale. For example, the dimensions of some of the elements are exaggerated relative to each other. Further, where considered appropriate, reference numerals have been repeated among the figures to indicate corresponding elements. The present invention may be embodied in several forms and manners. Those of skill in the art will appreciate that the invention may be embodied in other forms and manners not shown below. The invention shall have the full scope of the claims and is not to be limited by the embodiments shown below.

In wireless communication, since frequency selective fading distorts the signal, a popular modulation scheme partitions the transmitted signal into a number of narrow "frequency subchannels", or frequency bins. Each subchannel is associated with a respective subcarrier upon which data is modulated, and may be viewed as an independent "transmission channel" and being very narrow is free of any frequency domain distortion save a simple scaling.

The use of multiple transmitter and receiver antennas to increase reliability and rate of transmission in wireless channels is also known as MIMO (Multiple input-multiple output) system.

The present invention pertains to a method and system for encoding and transmission of symbols in a MIMO system. A signal undergoes encoding before transmission. Encoding generally dictates the decoding mechanism. Once the encoding process has been completed, the signal is transmitted using the transmitter antennas. There are several transmission schemes known in the art. A "Rate" is defined as the ratio of the number of complex symbols transmitted in one codeword to the product of the number frequency sub-carriers and time slots used in the codeword. An embodiment of the invention discloses a method of encoding in a rate-2 complex symbols per second per hertz (eight symbols per codeword) transmission system using the multiple transmit antennas where the encoded symbols can be transmitted over three and four transmit antennas. Transmitting symbols in a Rate-2 transmitter system with three transmit antennas provides a diversity of three while four transmit antennas provides a diversity of four.

Turning now to FIG. 1 shows a Multiple Input Multiple Output system in a wireless communications channel 135. Pursuant to an embodiment, of the invention, FIG. 1 illustrates n transmit antennas 105, 110, 115 and m receive antennas 120, 125, 130 being used to transmit signals over the transmission channel. The receive antennas may be on any wireless receiver residing on a base station and located on a radio tower, access point or hub or station, or on any wireless enabled client device such as a wireless computer, wireless laptop or a hand held device, such as a mobile phone or a personal digital assistant (PDA). The number of receive antennas cannot be less than 2. The transmit antennas can be on any wireless transmitter residing on a base station and located on a radio tower, access point or hub or station, or on any wireless enabled client device such as a wireless computer, wireless laptop or a hand held device, such as a mobile phone or a personal digital assistant (PDA). The data to be transmitted needs to be mapped onto a signal for transmission to the receiver that is interpreted on the receiver which is then decoded to retrieve the original data. The transmitted signal may include video, audio, voice or other forms of data.

In order to encode the signal efficiently, each signal is represented in the form of complex symbols. A complex symbol used in the encoding process, essentially comprises a real part and an imaginary part. The degree of redundancy in the encoding process is related to the diversity sought in transmission. This redundancy can be incorporated as space time or frequency block codes.

Figure 2:
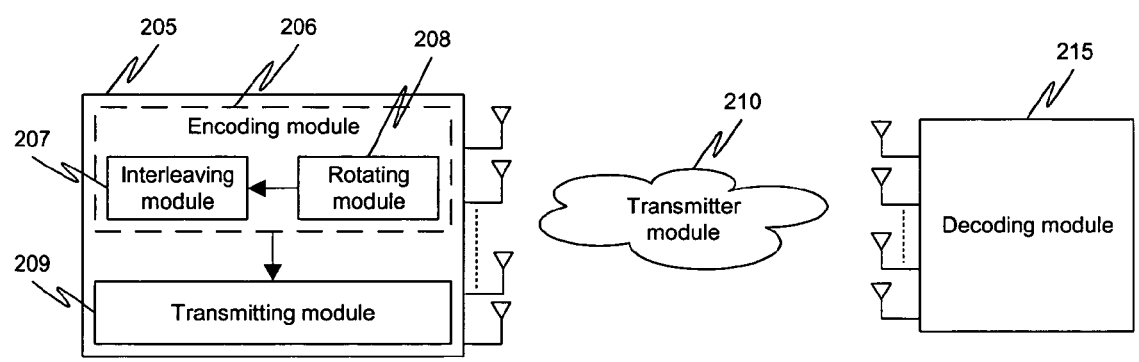
FIG. 2 depicts a block diagram of an embodiment of the invention showing the various components of the invention in which the present invention is deployed.

FIG. 2 illustrates a wireless communications system under an exemplary embodiment of the invention. The wireless communication system comprises a transmitter antenna system 205. The transmitter receives a string of bits for transmission. The string of bits represents the data that needs to be transmitted and therefore undergo an encoding process before being transmitted. The transmitter antenna system is coupled to a plurality of transmit antennas to enable a MIMO transmission. In one embodiment of the invention, the antenna system 205 comprises three transmit antennas and achieves a diversity of three due to the encoding and transmission techniques, explained below in greater detail. A maximum diversity of four is not achieved using three transmitter antennas as some interleaved symbols lack redundant symbols to assist in the decoding process. This is explained in FIG. 3 below. As shown in FIG. 2 the antenna system comprises an encoding module 206. The encoding module 206 further comprises a rotating module 208 and an interleaving module 207 in communication with each other. The encoding module is responsible for encoding the string of bits (complex symbols) and send the encoded bits to the transmitting module 209. Similarly, the receiver end comprises a decoding module 215 coupled to a plurality of receiver antennas to receive the encoded bits. The encoded bits on being decoded yield the original data that is being transmitted from the transmitter end.

Pursuant to an exemplary embodiment of the invention, the transmitter antenna system 205 is coupled to three transmit antennas which use a rate-2 complex symbols per second per hertz (eight complex symbols per codeword) transmission scheme. The string of bits representing the data that needs to be transmitted are mapped onto a constellation such as a Quadrature Amplitude Modulation (QAM) constellation. The transmitted complex symbols, eight complex symbols in a rate-2 scheme, take values from a constellation. The string of bits represents the base band signal, which is transmitted over the transmission channel using a carrier frequency. An embodiment of the invention, for transmitting the eight complex symbols chosen from the constellation using four transmit antennas is explained later.

Figure 5A:
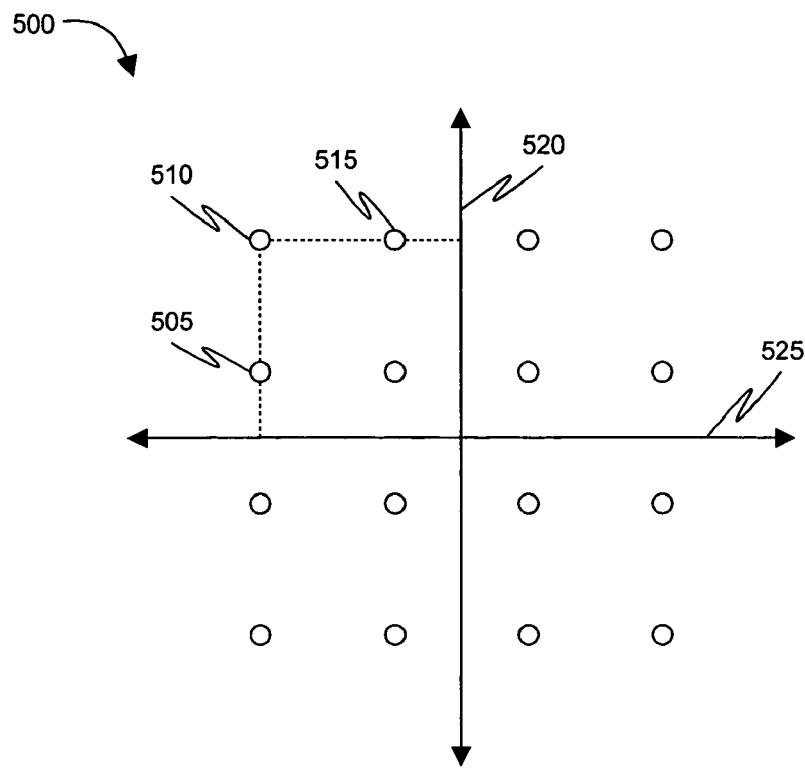
FIG. 5($a$) and FIG. 5($b$) illustrate a regular and rotated constellation respectively.
Figure 5B:
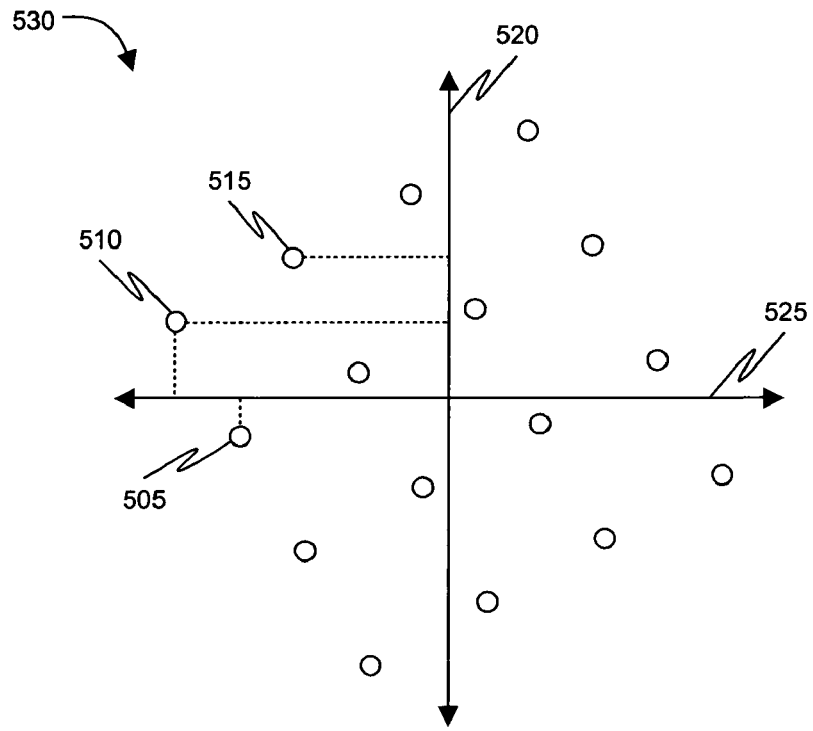

The encoding module 206 receives a set of eight symbols (Rate-2) that obtain values from a constellation. As per an embodiment of the invention, each symbol in the constellation is represented in a different manner than each other symbol. A complex symbol is two-dimensional and can be placed on a number plane defined by a real number axis (horizontal) and an imaginary number axis (vertical). Hence a complex number has a real part and imaginary part written in the form a+jb, where 'a' represents the position along the real axis, while 'b' represents the position along the imaginary axis. The two-dimensional values relate to the magnitude and phase of an electromagnetic wave traveling through free space. As per an embodiment of the invention any two symbols in the constellation have different real parts and different imaginary parts. In other words, no two symbols in the constellation lie on a vertical or on a horizontal line of the complex plane. In the case where the constellation is not represented in this manner, the constellation is rotated by an angle, example $0.5*\tan^{-1}(2)$, which results in a constellation with the above property. The constellation satisfying the above property is called a rotated constellation. The process of rotation to obtain a rotated constellation is shown in FIG. 5(a) and FIG. 5(b). Those skilled in the art shall appreciate that the constellation may not need to be rotated if the constellation satisfies the above property.

The set of eight complex symbols to be transmitted, chosen from the constellation are represented as $x_1, x_2, x_3, x_4, x_5, x_6, x_7$ and $x_8$. Although the set of eight symbols chosen from the constellation can be the same symbol with the same real and imaginary parts, the constellation that each symbol from the set of eight symbols is chosen from is represented in a different manner than each other symbol. In other words, the real part of a symbol from the constellation is different from the real part of any other symbol and the imaginary part of a symbol from the constellation is different from the imaginary part of any other symbol of the constellation. However, the real part of one symbol can be equal to the imaginary part of another symbol in the constellation. The symbols that obtain values from the constellation i.e. $x_1, x_2, x_3, x_4, x_5, x_6, x_7$ and $x_8$ are then interleaved. Interleaving is a process where, in one embodiment, the real part of a complex symbol $x_1$ is combined with an imaginary part of complex symbol $x_7$ and the real part of $x_2$ is combined with the imaginary part of $x_8$. For example, as per one embodiment, the interleaving can be as shown below:

$$\tilde{X}_1 = x_{1I} + j\, x_{7Q};$$

$$\tilde{X}_2 = x_{2I} + j\, x_{8Q};$$

$$\tilde{X}_3 = x_{3I} + j\, x_{5Q};$$

$$\tilde{X}_4 = x_{4I} + j\, x_{6Q};$$

$$\tilde{X}_5 = x_{5I} + j\, x_{3Q};$$

$$\tilde{X}_6 = x_{6I} + j\, x_{4Q};$$

$$\tilde{X}_7 = x_{7I} + j\, x_{1Q};$$

$$\tilde{X}_8 = x_{8I} + j\, x_{2Q};$$

where $\tilde{X}1, \tilde{X}2, \tilde{X}3, \tilde{X}4, \tilde{X}5, \tilde{X}6, \tilde{X}7$ and $\tilde{X}8$ are the set of eight interleaved symbols corresponding to the set of eight complex symbols chosen from the constellation, which fulfill the relation, $x_i = x_{iI} + j\, x_{iQ}$; where $i=1, 2, 3 \ldots 8$ and $j=\sqrt{-1}$. The interleaving module 207 combines the symbols in a manner where each interleaved symbol comprises information of two symbols from the set of the eight symbols. This is possible because each interleaved symbol is the combination of the real part of one symbol and the imaginary part of another. Those skilled in the art shall appreciate that the interleaving can be performed using various permutations and combinations of each of the symbols chosen from the constellation.

The encoding module sends the set of eight interleaved symbols to a transmitting module 209 for transmitting the set of eight interleaved symbols using the three transmit antennas. The interleaved symbols can be represented as a matrix where each row of the matrix represents a transmitter antenna and the symbols are transmitted using the transmitter antennas. Those skilled in the art shall appreciate that the matrix representation merely serves to provide a means for representing the interleaved symbols and other ways of representing the interleaved symbols can also be used and all such ways are within the scope of the present invention. As stated previously, the set of eight interleaved symbols corresponding to the set of eight symbols chosen from the constellation are subjected to a process which creates a complex conjugate and a negative complex conjugate of each interleaved symbol to incorporate redundancy during transmission. Redundantly transmitting a selected few of the set of eight interleaved symbols in different forms, such as a complex conjugate and a negative complex conjugate of the interleaved symbols provides additional support to the decoding module to retrieve the original data accurately incase symbol information is lost in the transmission channel 210 due to the presence of extraneous factors.

As per the exemplary embodiment of the invention, two transmit antennas of the three transmit antennas transmits a predetermined combination of a first four interleaved symbols, a complex conjugate of the first four interleaved symbols and a negative complex conjugate of the first four interleaved symbols from the set of eight interleaved symbols in a predetermined manner over a first transmission channel 210 and a predetermined combination of a second four interleaved symbols, a complex conjugate of the second four interleaved symbols and a negative complex conjugate of the second four interleaved symbols from the set of eight interleaved symbols in a manner over a second transmission channel 210. The transmission ensures that each transmitter antenna of the three transmitter antennas transmits information (real part or imaginary part) about each symbol from the set of eight symbols over two transmission channels 210. The arrangement of the interleaved symbols is such that they are transmitted over two transmission channels using three or four antennas.

The term "a transmission channel" 210 refers to a frequency over which the symbols are transmitted using a carrier frequency. Since the interleaving module 207 ensures that each interleaved symbol comprises information of two complex symbols, the transmitter antenna while transmitting each interleaved symbol is in essence transmitting information of two complex symbols. The interleaving process enables a diversity of three for a three transmitter antenna system. Those skilled in the art shall appreciate that the interleaved symbols can be transmitted based on various permutations as long as each transmitter antenna transmits information of each symbol form the set of eight symbols in a rate-2 transmission scheme.

Similarly, in the case of a four antenna transmit system the transmission ensures that each transmitter antenna of the four transmitter antennas transmits information (real part or imaginary part) about each symbol from the set of eight symbols over two transmission channels 210 at two time instances.

Figure 3:
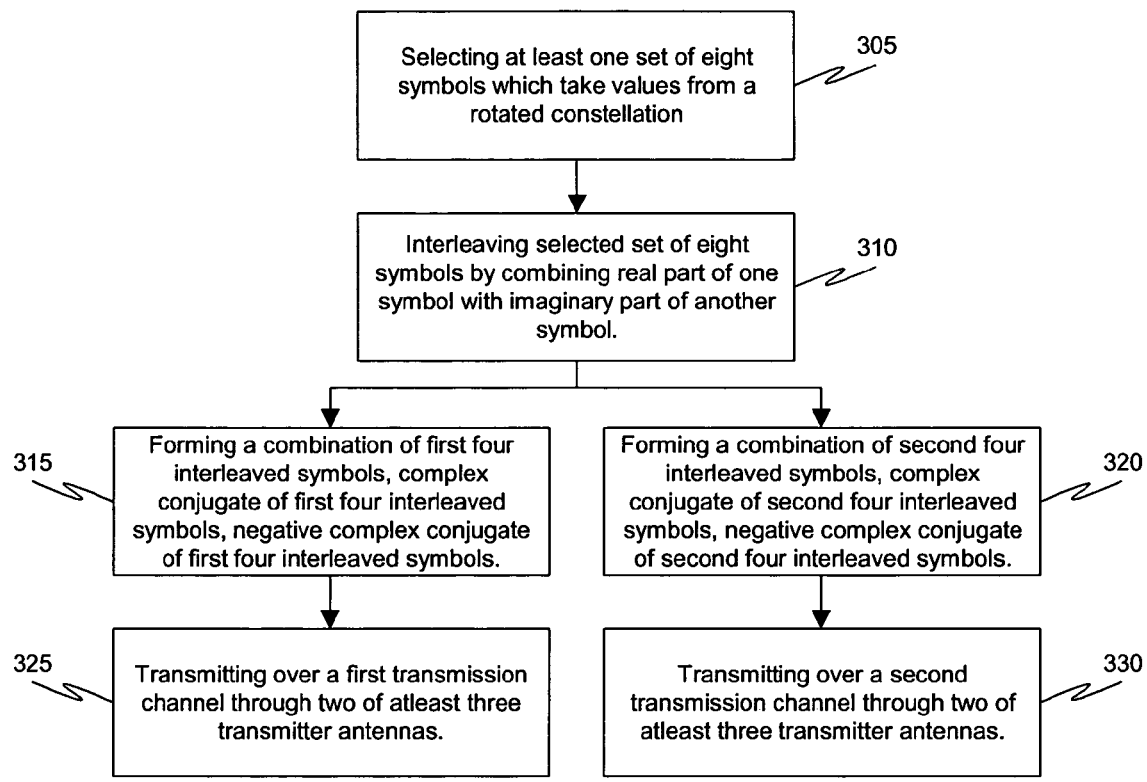
FIG. 3 depicts a flow diagram of the steps performed in the process of encoding the input signal set.

Turning now to FIG. 3, shows a flow diagram of the steps performed in the process of encoding and thereafter transmitting the set of eight symbols. Initially, a string of bits which represents data to be transmitted, are mapped onto constellation points. The set of eight symbols take values from the constellation points. Based on the requirement, the same signal point from the constellation can be chosen for the set of eight symbols. As per one embodiment, eight different symbols are chosen from the constellation. Each signal point in the constellation has a different representation compared to the other symbol, step 305. If the representation of the signal points is the same, which means, that the real or imaginary part of at least one signal point is the same as the real and imaginary part of any other signal point, the constellation is rotated. A preferred angle for rotation is $0.5 * \tan^{-1}(2)$.

Assume the set of eight symbols being represented as $x_1, x_2, x_3, x_4, x_5, x_6, x_7$ and $x_8$. Those skilled in the art shall appreciate that $x_1, x_2, x_3, x_4, x_5, x_6, x_7$ and $x_8$ can take the same value or different value from the constellation. In one embodiment, $x_1, x_2, x_3, x_4, x_5, x_6, x_7$ and $x_8$ are different signal points chosen from a rotated constellation. The set of eight symbols are then interleaved, step 310. The interleaving of the symbols ensures that each interleaved symbol comprises information of two symbols from the set of eight symbols. This achieves a diversity of three on a three transmitter antenna system. As per one embodiment, the interleaving process combines the real part of one symbol with the imaginary part of another symbol. The result is that each interleaved signal bears a real part of one signal and an imaginary part of another signal. For the set of symbols $x_1, x_2, x_3, x_4, x_5, x_6, x_7$ and $x_8$ the interleaving process can be done in several ways. For example, $$\tilde{X}_1 = x_{1I} + j\, x_{7Q}$$

$$\tilde{X}_2 = x_{2I} + j\, x_{8Q}$$

$$\tilde{X}_3 = x_{3I} + j\, x_{5Q}$$

$$\tilde{X}_4 = x_{4I} + j\, x_{6Q}$$

$$\tilde{X}_5 = x_{5I} + j\, x_{3Q}$$

$$\tilde{X}_6 = x_{6I} + j\, x_{4Q}$$

$$\tilde{X}_7 = x_{7I} + j\, x_{1Q}$$

$$\tilde{X}_8 = x_{8I} + j\, x_{2Q}$$

where $\tilde{X}_1, \tilde{X}_2, \tilde{X}_3, \tilde{X}_4, \tilde{X}_5, \tilde{X}_6, \tilde{X}_7, \tilde{X}_8$ are the set of eight interleaved symbols corresponding to the set of eight symbols. Those skilled in the art shall appreciate that $\tilde{X}_1, \tilde{X}_2, \tilde{X}_3, \tilde{X}_4, \tilde{X}_5, \tilde{X}_6, \tilde{X}_7, \tilde{X}_8$ can be interleaved in several different ways and all such ways are within the scope of the present invention.

Additionally to incorporate redundancy during transmission to account for the loss due to transmission channel fading, noise, interference or any other form of loss of signal, each interleaved symbol is replicated in the form of a complex conjugate and a negative complex conjugate. Performing a complex conjugate and a negative complex conjugate changes the sign of a certain term in the complex symbol and can be used to get additional information of the complex symbol in the event of a loss of signal in the transmission channel. For example, if the interleaved symbol $\tilde{X}_2$ which comprises information of complex symbols $x_2$ and $x_8$ suffers interference, the complex conjugate of $\tilde{X}_2$ represented as $\tilde{X}_2{}^*$ can be used to retrieve information of the original channel symbol.

Once the complex symbols have been interleaved, in one embodiment, they are arranged in a matrix where each row of the matrix corresponds to a transmitter antenna. Pursuant to one embodiment, the matrix can be represented as follows for a three transmit antenna system. Those skilled in the art shall appreciate that the matrix is merely meant to depict a representation for transmission of the interleaved symbols and any structure that enables transmission in the manner described below can be used and all such structures are within the scope of the present invention.

| $\tilde{X}_1$ | $\tilde{(-X_2)}^*$ | $\tilde{X}_5$ | $\tilde{(-X_6)}^*$ |
|---|---|---|---|
| $\tilde{X}_2$ | $\tilde{X}_1{}^*$ | $\tilde{X}_6$ | $\tilde{X}_5{}^*$ |
| $\tilde{X}_3$ | $\tilde{X}_4$ | $\tilde{X}_7$ | $\tilde{X}_8$ |

Each row of the matrix represents a transmitter antenna and the first two columns represent a first transmission channel (a specified frequency for transmission) and the last two columns represent a second transmission channel. The interleaved symbols in the first column and the third column are transmitted at the first time and the interleaved symbols in the second column and the fourth column are transmitted at the second time. However, the interleaved symbols from the first two columns are transmitted over a first transmission channel and the interleaved symbols from the last two columns are transmitted over a second transmission channel.

Subsequent to the interleaving operation, a combination of a first four interleaved symbols, a complex conjugate of the first four interleaved symbols and a negative complex conjugate of the first four interleaved symbols from the set of eight interleaved symbols are created and transmitted using two transmit antennas from the three transmit antennas over a first transmission channel and a combination of a second four interleaved symbols, a complex conjugate of the second four interleaved symbols and a negative complex conjugate of the second four interleaved symbols from the set of eight interleaved symbols is transmitted using the remaining antenna from the three transmit antennas over a second transmission channel, step 315, 320, 325, 330.

For example, in the embodiment of the matrix provided above, the first antenna transmits interleaved symbol $\tilde{X}_1$ and a negative complex conjugate of $\tilde{X}_2$ represented as $-\tilde{(X_2)}^*$ on the first transmission channel and interleaved symbol $\tilde{X}_5$ and negative complex conjugate of $\tilde{X}_6$ represented as $-\tilde{(X_6)}^*$ on the second transmission channel. Hence, $\tilde{X}_1$ comprises information of complex symbol $x_1$ and complex symbol $x_7$ while $-\tilde{(X_2)}^*$ comprises information of complex symbol $x_2$ and complex symbol $x_8$. The second transmit antenna transmits interleaved symbol $\tilde{X}_2$ and complex conjugate of interleaved symbol $\tilde{X}_1$ on the first transmission channel and interleaved symbol $\tilde{X}_6$ and a complex conjugate of $\tilde{X}_5$ represented as $\tilde{(X_5)}^*$ on the second transmission channel. The arrangement of the interleaved symbols for transmission is such that the interleaved symbols of the first row and the interleaved symbols of the second row, being transmitted over the first transmission channel retain an orthogonal property. Similar to the first transmit antenna, the set of four interleaved symbols transmitted using the second transmit antenna also comprise information of each complex symbol and in addition incorporate redundancy with the transmission of complex conjugates and negative complex conjugates of the interleaved symbols. The third transmit antenna transmits interleaved symbol $\tilde{X}_3$ and $\tilde{X}_4$ over the first transmission channel and interleaved symbol $\tilde{X}_7$ and $\tilde{X}_8$ over the second transmission channel. The interleaved symbols in the first column and the third column are transmitted at the first time instance and the interleaved symbols in the second column and the fourth column are transmitted at the second time instance. The encoding process for three transmitter antennas achieves a diversity of three and not a maximum diversity of four. This is because, as per the embodiment disclosed above, the last row of the matrix representation transmits interleaved symbols $\tilde{X}_3, \tilde{X}_4, \tilde{X}_7, \tilde{X}_8$ without their corresponding redundant interleaved symbols. While information of each of the other complex symbols, for example $x_1$ is transmitted using the interleaved symbol $\tilde{X}_1$, the complex conjugate of $\tilde{X}_1$ namely $\tilde{X}_1{}^*$ and the interleaved symbol $\tilde{X}_7$ each of which comprises information of $x_1$, the interleaved symbols $\tilde{X}_3, \tilde{X}_4, \tilde{X}_7, \tilde{X}_8$ do not have such corresponding redundant symbols to assist in the decoding process. Hence the maximum achievable diversity is three in the case of three transmit antennas. The encoding incorporates a time, space and frequency division multiplexing simultaneously.

In another embodiment, the third transmit antenna can also transmit interleaved symbol $\tilde{X}_3$ and a negative complex conjugate of interleaved symbol $\tilde{X}_4$ namely $\tilde{(-X_4)}^*$ over the first transmission channel and interleaved symbol $\tilde{X}_7$ and a negative complex conjugate of interleaved symbol $\tilde{X}_8$ namely $\tilde{(-X_8)}^*$ on the second transmission channel as shown below.

| $\tilde{X}_1$ | $\tilde{(-X_2)}^*$ | $\tilde{X}_5$ | $\tilde{(-X_6)}^*$ |
|---|---|---|---|
| $\tilde{X}_2$ | $\tilde{X}_1{}^*$ | $\tilde{X}_6$ | $\tilde{X}_5{}^*$ |
| $\tilde{X}_3$ | $\tilde{(-X_4)}^*$ | $\tilde{X}_7$ | $\tilde{(-X_8)}^*$ |

Similarly, in the case of four transmit antennas, the arrangement of the matrix will be as follows, where each row of the matrix represents a transmit antenna

| ~X₁ | ~(-X₂)* | ~X₅ | ~(-X₆)* |
| ~X₂ | ~X₁* | ~X₆ | ~X₅* |
| ~X₃ | ~(-X₄)* | ~X₇ | ~(-X₈)* |
| ~X₄ | ~X₃* | ~X₈ | ~X₇* |

Each transmit antenna transmits information of all symbols over two transmission channels. The method of encoding and transmission described above is similar to the one described for three transmit antennas. Maximum diversity of four is achieved using the encoding method disclosed above on a four transmit antenna system. This is because, as per the embodiment disclosed above, every interleaved symbol has a corresponding redundant interleaved symbol within the matrix representation thereby achieving a diversity of four. Those skilled in the art shall appreciate that as stated previously, the set of four interleaved symbols can be replaced by other interleaved symbols in any manner such that each transmitter antenna transmits information of all four symbols while incorporating redundancy.

Figure 4:
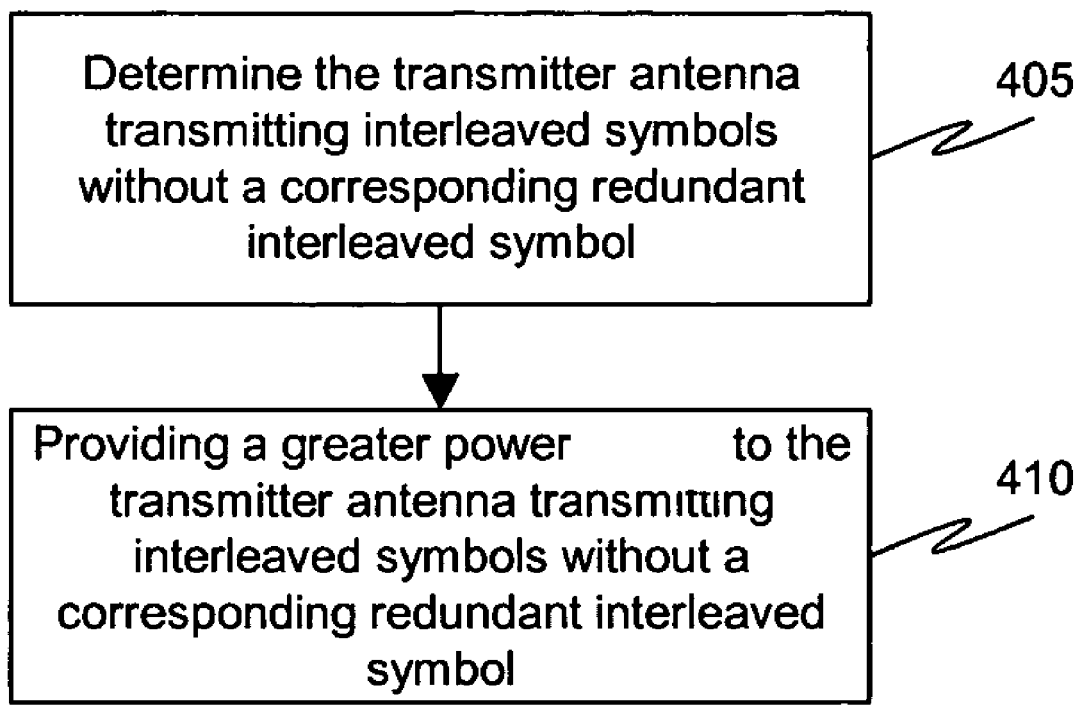
FIG. 4 illustrates a flow diagram of the steps performed in the process of unequal power loading.

FIG. 4 illustrates a flow diagram depicting a proportionate allotment of power to each transmitter antenna due to the transmission technique disclosed above pursuant to an embodiment of the present invention. As per the embodiment disclosed above, the transmitter system can determine which transmitter antenna transmits interleaved symbols without a corresponding redundant interleaved symbol, step 405. For example, in the embodiment disclosed above, the last row of the matrix representation transmits interleaved symbols $~X_3$, $~X_4$, $~X_7$, $~X_8$ without their corresponding redundant interleaved symbols. Hence, to improve the signal to noise ratio, the third transmitter antenna transmitting the interleaved symbols without their corresponding redundant interleaved symbols can be supplied greater power to increase the strength of the signal based on a weighted average of the number of interleaved symbols. Increasing the signal strength may reduce the amount of interference the signal may suffer during transmission, step 410. For example, in order to attain data protection, unequal power is allotted to the available antennas so that the antenna transmitting the weaker symbols (the symbols without the supporting redundant symbols) are allotted more power than symbols that have corresponding redundant symbols to assist in the decoding process. The embodiment of unequal allotment of power is illustrated in the matrix "B" below:

$$B = \begin{bmatrix} \sqrt{3/4} & 0 & 0 \\ 0 & \sqrt{3/4} & 0 \\ 0 & 0 & \sqrt{3/2} \end{bmatrix} \begin{bmatrix} x_1 & -x_2^* & x_5 & -x_6^* \\ x_2 & x_1^* & x_6 & x_5^* \\ x_3 & -x_4^* & x_7 & -x_8^* \end{bmatrix}$$

Note that the effect of multiplying with the matrix B above is to allocate to the third antenna twice the power that is allocated to the first two antennas.

Turning now to FIG. 5(a) depicting a regular QAM constellation 500 pursuant to an embodiment of the present invention. Some symbols from the set of symbols being represented by signal points have the same real or imaginary part as another symbol from the set of symbols. The horizontal axis 525 represents the real axis and the vertical axis 520 represents the imaginary axis. For example, complex symbol 505 has the same real part as complex symbol 510 and complex symbol 510 has the same imaginary part as complex symbol 515. Hence, FIG. 5(b) shows a rotated constellation 530 where the previous constellation 500 is rotated by a predetermined angle, for example $0.5*\tan^{-1}(2)$, to obtain the rotated constellation 530. The rotated constellation 530 comprises points such that no two symbols from the set of symbols have the same real or imaginary part as another symbol. For example, complex symbol 505, after rotation has a different real part than the complex symbol 510 and a different real part than all complex symbols of the constellation and complex symbol 510, after rotation has a different imaginary part than complex symbol 515 and different imaginary part than all complex symbols of the constellation. It is obvious to those skilled in the art that the real part of one complex symbol can be the same as the imaginary part of another complex symbol.

The present invention addresses an encoding and transmission method using three or four antennas.

What is claimed is:

1. An arrangement for transmitting a set of eight symbols using at least three transmit antennas, the arrangement comprising:

an encoder to receive a set of eight interleaved symbols corresponding to the set of eight symbols, each interleaved symbol from the set of eight interleaved symbols being created by combining a first part of one symbol with a second part of one other symbol, the symbol and the one other symbol forming part of the set of eight symbols, and a replication of a conjugate of each interleaved symbol and a negative complex conjugate of each interleaved symbol; and an arranging means for arranging the set of eight interleaved symbols in a matrix, the matrix having at least three rows and four columns, each row of the matrix corresponding to a transmitter antenna, wherein the matrix comprises:

a first row with a combination of a first interleaved symbol, a negative complex conjugate of a second interleaved symbol from the set of eight interleaved symbols in a first two columns of the matrix, a third interleaved symbol and a negative complex conjugate of a fourth interleaved symbol from the set of eight interleaved symbols in a last two columns of the matrix, a second row with a combination of a complex conjugate of the first interleaved symbol and the second interleaved symbol from the set of eight interleaved symbols in the first two columns of the matrix and a complex conjugate of the third interleaved symbol and the fourth interleaved symbol from the set of eight interleaved symbols in the last two columns of the matrix, a third row with a combination of a fifth interleaved symbol, a negative complex conjugate of a sixth interleaved symbol from the set of eight interleaved symbols in a first two columns of the matrix, a seventh interleaved symbol and a negative complex conjugate of an eighth interleaved symbol from the set of eight interleaved symbols in a last two columns of the matrix, the first two columns representing a first transmission channel and the last two columns representing a second transmission channel.

2. The arrangement of claim 1, wherein the set of eight symbols is selected from a set of symbols represented by a rotated constellation, each symbol from the set of symbols is represented in a different manner than another symbol from the set of symbols.

3. The arrangement of claim 2, further comprises rotating the constellation by an angle, 0.5 tan−1(2) if a real or an imaginary pan of one symbol from the set of symbols has a same real or an imaginary part as another symbol from the set of symbols.

4. The arrangement of claim 1, wherein the matrix in the arranging step further comprises:
- a fourth row representing a fourth transmitter antenna transmitting a combination of the sixth interleaved symbol, a complex conjugate of the fifth interleaved symbol from the set of eight interleaved symbols in a first two columns of the matrix, the eighth interleaved symbol and a complex conjugate of the seventh interleaved symbol from the set of eight interleaved symbols in a last two columns of the matrix.

5. The arrangement of claim 1, wherein the first part is a real part of the symbol and the second part is an imaginary part of the other symbol.

6. A system for transmitting at least one set of eight symbols, the system comprising:
- an encoding module to receive the at least one set of eight symbols from a set of symbols, the set of symbols being represented by a rotated constellation wherein each symbol from the set of symbols is represented in a different manner from each other symbol from the set of symbols, the encoding module further comprising:
- an interleaving module to interleave each symbol from the set of eight symbols with a corresponding combining symbol to obtain a set of eight interleaved symbols corresponding to the set of eight symbols, each interleaved symbol from the set of eight interleaved symbols comprises an information of the symbol and the corresponding combining symbol, the symbol and the corresponding combining symbol forming a part of the set of eight symbols;
- a transmitting module for transmitting a combination of a first four interleaved symbols from the set of eight interleaved symbols, a complex conjugate of the first four interleaved symbols and a negative complex conjugate of the first four interleaved symbols using the at least three transmit antennas wherein each transmit antenna transmits information of each interleaved symbol from the set of the eight interleaved symbols over two transmission channels, each transmission channel transmitting information of each interleaved symbol from the set of the eight interleaved symbols using the at least three transmit antennas; wherein the encoding module further comprises:
- a rotating module to rotate a constellation if a real or an imaginary part of one symbol of the constellation has a same real or an imaginary part of another symbol of the constellation to obtain a rotated constellation.

7. The system of claim 6, wherein the encoding module and the transmitting module are integrated within a single module.

8. The system of claim 7, wherein the single module can be implemented as part of a base station or a subscriber station.

9. The system of claim 7, wherein the single module can be implemented on a microprocessor.

10. The system of claim 6, wherein the encoding module and the transmitting module can be configured to transmit the set of eight interleaved symbols using an additional transmitter antenna in a predetermined manner.

11. The system of claim 6, wherein the at least one set of eight symbols are transmitted over a wireless medium.

12. A method for transmitting a set of arranged symbols using at least three transmit antennas, the method comprising:
- generating a set of eight interleaved symbols corresponding to the set of eight symbols, each interleaved symbol from the set of eight interleaved symbols being created by combining a first part of one symbol with a second part of one other symbol, the symbol and the one other symbol forming part of the set of eight symbols; and
- generating the arranged symbols by arranging the set of eight interleaved symbols according to a matrix, the matrix having at least three rows and four columns, each row of the matrix corresponding to a transmitter antenna, wherein the matrix comprises:
- a first row with a combination of a first interleaved symbol and a negative complex conjugate of a second interleaved symbol from the set of eight interleaved symbols in a first two columns of the matrix, a third in interleaved symbol and a negative complex conjugate of a fourth interleaved symbol from the set of eight interleaved symbols in a last two columns of the matrix,
- a second row with a combination of a complex conjugate of the first interleaved symbol and the second interleaved symbol from the set of eight interleaved symbols in the first two columns of the matrix and a complex conjugate of the third interleaved symbol and the fourth interleaved symbol from the set of eight interleaved symbols in the last two columns of the matrix,
- a third row with a combination of a fifth interleaved symbol and a negative complex conjugate of a sixth interleaved symbol from the set of eight interleaved symbols in a first two columns of the matrix, a seventh interleaved symbol and a negative complex conjugate of an eighth interleaved symbol from the set of eight interleaved symbols in a last two columns of the matrix, the first two columns representing a first transmission channel and the last two columns representing a second transmission channel.

13. The arrangement of claim 12, wherein the matrix in the arranging step further comprises:
- a fourth row representing a fourth transmitter antenna transmitting a combination of the sixth interleaved symbol, a complex conjugate of the fifth interleaved symbol from the set of eight interleaved symbols in a first two columns of the matrix, the eighth interleaved symbol and a complex conjugate of the seventh interleaved symbol from the set of eight interleaved symbols in a last two columns of the matrix.

14. A method for transmitting a set of arranged symbols using at least three transmit antennas, the method comprising:
- generating a set of eight interleaved symbols corresponding to the set of eight symbols, each interleaved symbol from the set of eight interleaved symbols being created by combining a first part of one symbol with a second part of one other symbol, the symbol and the one other symbol forming part of the set of eight symbols; and
- generating the arranged symbols by arranging the set of eight interleaved symbols according to a matrix, the matrix having at least three rows and four columns, each row of the matrix corresponding to a transmitter antenna, wherein the matrix comprises:
- a first row with a combination of a first interleaved symbol and a negative complex conjugate of a second interleaved symbol from the set of eight interleaved symbols in a first two columns of the matrix, a third interleaved symbol and a negative complex conjugate of a fourth interleaved symbol from the set of eight interleaved symbols in a last two columns of the matrix,
- a second row with a combination of a complex conjugate of the first interleaved symbol and the second interleaved symbol from the set of eight interleaved symbols in the first two columns of the matrix and a complex conjugate of the third interleaved symbol and the fourth interleaved symbol from the set of eight interleaved symbols in the last two columns of the matrix, a third row with a combination of a fifth interleaved symbol and a sixth interleaved symbol from the set of eight interleaved symbols in a first two columns of the matrix, a seventh interleaved symbol and an eighth interleaved symbol from the set of eight interleaved symbols in a last two columns of the matrix, the first two columns representing a first transmission channel and the last two columns representing a second transmission channel.

\* \* \* \* \*